United States Patent [19]

Nishimura et al.

[11] 4,302,031
[45] Nov. 24, 1981

[54] WEBBING ANCHOR LOCK MECHANISM

[75] Inventors: Yuji Nishimura, Nagoya; Tatsushi Kubota, Okazaki, both of Japan

[73] Assignee: K. K. Tokai Rika Denki Seisakusho, Aichi, Japan

[21] Appl. No.: 88,347

[22] Filed: Oct. 26, 1979

[30] Foreign Application Priority Data

Oct. 30, 1978 [JP] Japan ............................ 53-149155[U]

[51] Int. Cl.³ ............................................. B60R 21/00
[52] U.S. Cl. .................................................. 280/804
[58] Field of Search ................ 280/804, 802, 807, 808

[56] References Cited

U.S. PATENT DOCUMENTS 3,830,518  8/1974  Silber .................................. 280/804
4,061,365 12/1977  Nagano ............................... 280/804
4,213,652  7/1980  Irwin .................................. 280/804

FOREIGN PATENT DOCUMENTS 2440990  3/1976  Fed. Rep. of Germany ...... 280/804

Primary Examiner—Robert R. Song
Attorney, Agent, or Firm—Koda and Androlia

[57] ABSTRACT

An anchor plate engaging one end portion of an occupant restraining webbing is driven by a driving member movable along a guide rail provided on the vehicle body, whereby the webbing is automatically fastened to the occupant. A lock pawl of a locking plate pivotally supported by the vehicle body lock said anchor plate so as to support a tensile force of the webbing by the vehicle body in an emergency of the vehicle. A release block secured to the driving member rotates the locking plate, whereby the locking plate is disengaged from the anchor plate, so that the anchor plate become movable.

13 Claims, 9 Drawing Figures

WEBBING ANCHOR LOCK MECHANISM

BACKGROUND OF THE INVENTION

1. Field of the Invention

This invention relates to a webbing anchor lock mechanism for use in a seatbelt system of the type wherein a webbing anchor is movable along a guide rail for preventing the webbing anchor from moving during an emergency.

2. Description of the Prior Art

Heretofor, there have been proposed automatically fastening type seatbelt systems in which a webbing for restraining an occupant is automatically fastened to the occupant after the occupant enters the vehicle, whereby the webbing is reliably fastened to the occupant, to thereby improve the safety of the occupant. Such a seatbelt system is of such an arrangement that an anchor plate coupled to one end portion of the webbing for restraining the occupant is caused to run along a guide rail provided on the vehicle, whereby the webbing is automatically fastened to or unfastened from the occupant.

In this automatically fastening type seatbelt system, after the anchor plate is moved and the webbing is fastened to the occupant, it is necessary to prevent the anchor plate from moving so as to be prepared for an emergency of the vehicle. In particular, if the anchor plate moves when the vehicle is involved in a collision, then the restraining of the occupant becomes imperfect. Hence, it is necessary to reliably lock the anchor plate after the webbing is automatically fastened to the occupant, and to quickly unlock the anchor plate so as to make the anchor plate movable, when the occupant leaves the vehicle.

SUMMARY OF THE INVENTION

It is therefore a general object of the present invention to obviate the above-described problems, and therefore, an object of the present invention is to provide a webbing anchor lock mechanism of simple construction and capable of reliably locking the webbing anchor and unlocking the same.

The webbing anchor lock mechanism according to the present invention is constructed such that a locking lever is pivotally supported on the vehicle, a locking pawl for locking the anchor plate is provided at one end of said lever to prevent said anchor plate from moving, and said lock pawl is brought into abutting contact with a release block secured to a driving member for the anchor plate so as to unlock the anchor plate.

Description will hereunder be given of one embodiment of the present invention with reference to the drawings.

DESCRIPTION OF THE PREFERRED EMBODIMENT

Figure 1:
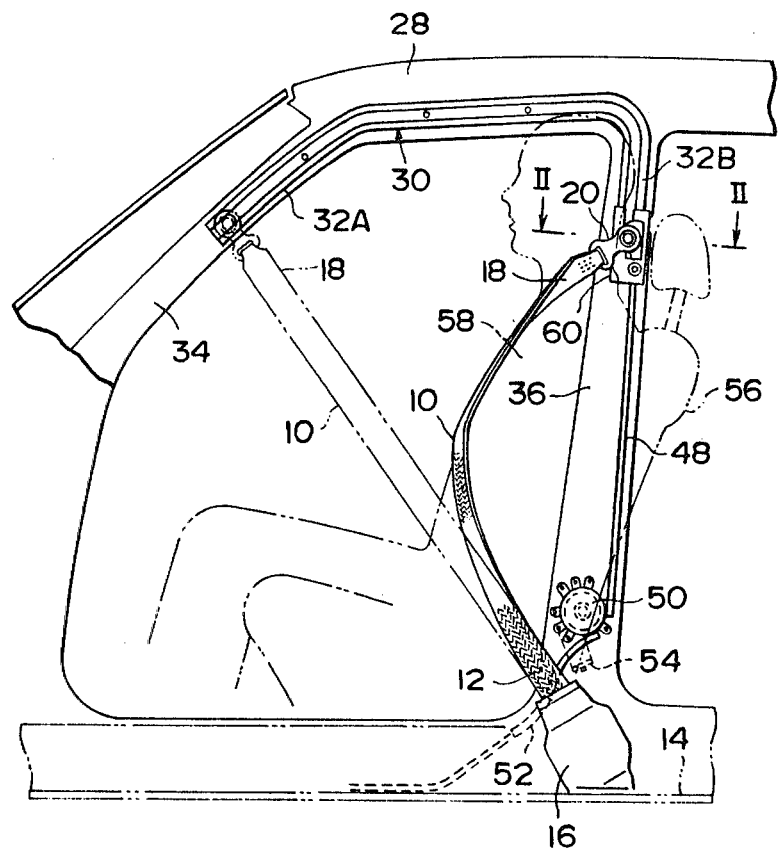
FIG. 1 is a side view showing one embodiment of the webbing anchor lock mechanism according to the present invention.

In FIG. 1, the inner end 12 of the occupant restraining webbing 10 is wound up into a retractor 16 secured to a floor member 14 at the substantially central portion of the vehicle by a biasing force of the retractor 16. The retractor 16 is a so-called emergency locking retractor and is provided therein with an inertia lock mechanism for suddenly interrupting the wind-off of the webbing 10 only in an emergency of the vehicle.

Figure 2:
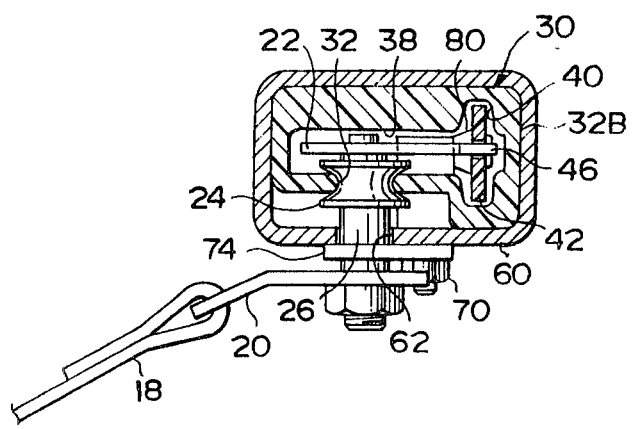
FIG. 2 is a cross-sectional view taken along the line II—II in FIG. 1.
Figure 3:
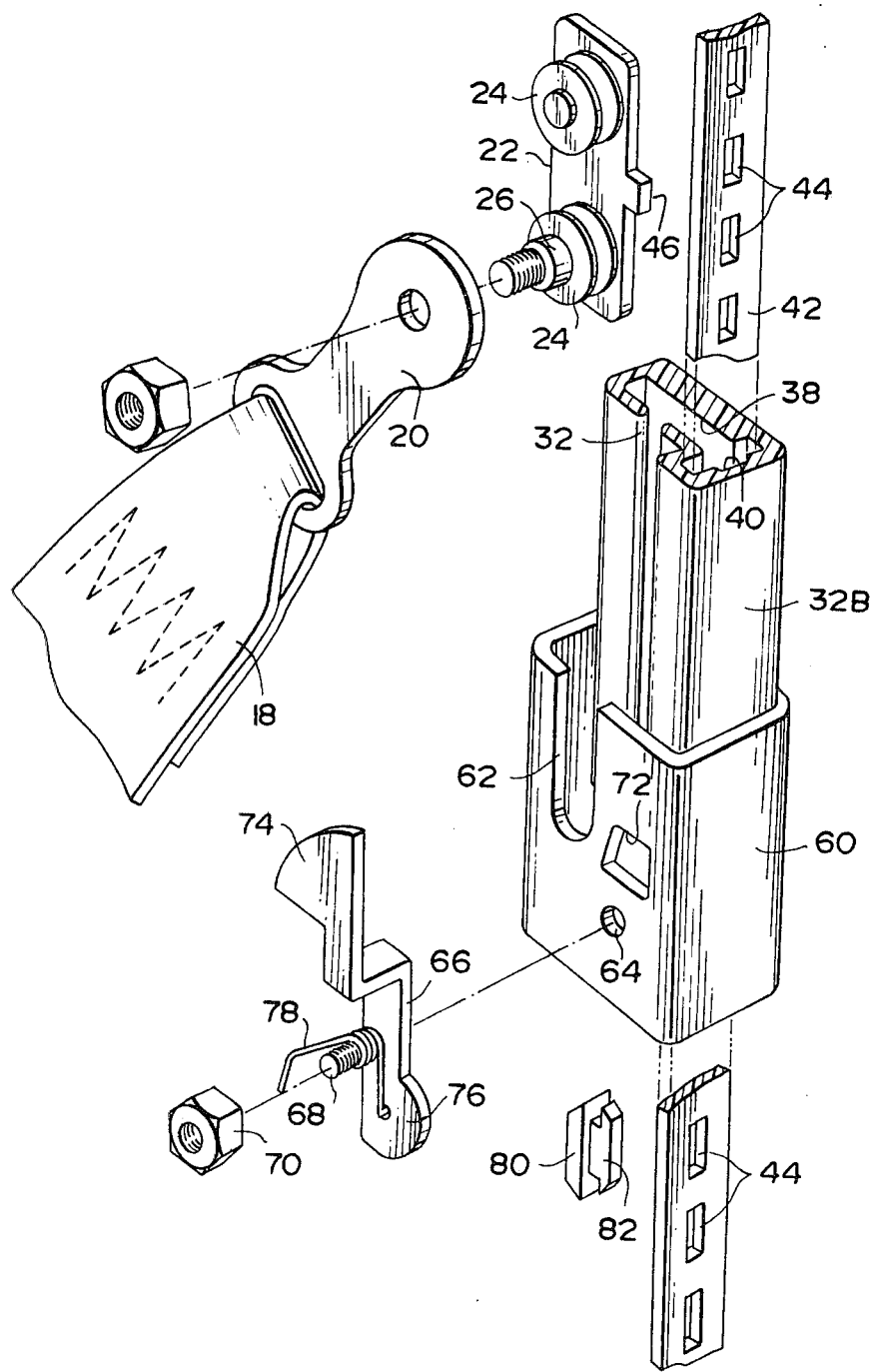
FIG. 3 is a perspective view of FIG. 1, with essential portions being disassembled.

On the other hand, the outer end 18 of the webbing 10, as shown in FIGS. 2 and 3, is turned back at an anchor plate 20, and thereafter, sewn thereonto, thus being connected to the anchor plate. Said anchor plate 20 is rotatably or unrotatably secured to a wheel shaft 26 pivotally supporting a wheel 24 of a truck 22, and movable with said truck 22.

The truck 22 is made movable along a rail portion 32 of a guide rail 30 secured to the cabin's side of a roof side 28 of the vehicle.

Here, said guide rail 30 is secured at the intermediate portion thereof to the roof side 28 substantially horizontally as shown in FIG. 1, the forward end portion 32A thereof being inclined along a front pillar 34 and the rear end portion 32B thereof being suspended along the center pillar 36.

Furthermore, said guide rail 30 is provided therein with a guide groove 38 being substantially rectangular in cross-section and a slide groove 40 contiguous to the end of said guide groove, and said slide groove 40 is adpated to house a tape 42 constituting a driving member for the truck. Said tape 42 is penetratingly provided therein with a multiplicity of openings 44 in the longitudinal direction as shown in FIG. 3, and an engageable projection 46 projecting from a portion of the truck 22 is inserted into one of the openings 44, so that the truck 22 is coupled to the tape 42 to move along with the tape 42.

The upper end of said tape 42 is adapted to be suspended along the center pillar 36, being guided in an auxiliary slide rail 48 connected to the rear end portion 32B of the guide rail. Further, the auxiliary slide rail 48 communicates with a sprocket housing 50 at the lower portion of the center pillar 36, the tape 42 being guided in said auxiliary slide rail 48 to mesh with a sprocket (not shown) in the sprocket housing 50. Furthermore, the remaining portion of the tape 42 is guided in a second auxiliary slide rail 52.

The sprocket in the sprocket housing 50 is driven by a motor 54 secured to the center pillar 36, and rotation of said motor 54 causes the tape 42 to move along the auxiliary slide rail and the slide groove 40 of the guide rail 30, so that the anchor plate 20 can be moved through the truck 22. Consequently, when said anchor plate 20 is moved to the rear end portion 32B of the guide rail 30 as indicated by solid lines in FIG. 1, the webbing 10 can be fastened to an occupant 58 seated at a seat 56. When the anchor plate 20 reaches the forward end portion 32A of the guide rail 30 by being driven by the motor as indicated by two-dot chain lines in FIG. 1, the webbing 10 can be separated from the occupant's seat 56, so that the webbing 10 can be automatically unfastened from the occupant 58.

Additionally, the motor 54 is adapted to detect the condition of the occupant being seated. For example, when the door for entering or leaving the vehicle is opened, the motor 54 rotates in a direction to elevate the tape 42 upwards along the center pillar 36, and, when said door is closed, rotates to move the tape 42 in the direction opposite to the above.

Next, as shown in FIGS. 2 and 3, a reinforcing frame 60 is provided at the rear end portion 32B of said guide rail 30 so as to surround the guide rail 30, and is solidly secured to the center pillar 36. Formed in said reinforcing frame 60 is a substantially letter 'U' shaped receiving groove 62 which is to receive a wheel shaft 26 of the truck 22, and therefore a portion of anchor plate 20, when the webbing is automatically fastened to the occupant, and substantially constitutes a stopper for the truck 22.

Furthermore, penetratingly provided in the reinforcing frame 60 is a cylindrical hole 64 for pivotally supporting a support shaft 68 solidly secured to a locking lever 66 in cooperation with a nut 70 in the reinforcing frame 60. The upper portion of said locking lever 66 is bent in a crank shape and projects inwardly into the cabin through a window 72 provided in the reinforcing frame 60. Formed at one end of the projecting locking lever 66 is segmental lock pawl 74, and, on the other hand, formed at the other end opposite to said lock pawl 74 is a crescent-shaped force-receiving projection 76. Additionally, a torsionaly coil spring 78 is confined between said locking lever 66 and the reinforcing frame 60 so as to bias said locking lever 66 to rotate in the counterclockwise direction in FIG. 3, and this rotation causes the force receiving projection 76 to come into contact with the substantially intermediate portion of the tape 42 in the width-wise direction, and at the same time, the lock pawl 74 engages the wheel shaft 26 which is inserted into the receiving groove 62, as shown in FIGS. 4C and 5A, so as to prevent the truck 22 from moving.

Engaged with one of the openings 44 of said tape 42 is an engageable projection 82 of a trapezoidal release block 80. With the arrangement as described above, the release block 80 moves together with the tape 42 to abut against the force receiving projection 76 of the locking lever 66, and, at the time of the abutment, the locking lever 66 is caused to rotate against the biasing force of the torsional coil spring 78, so that the lock pawl 74 can be disengaged from the wheel shaft 26.

Description will hereunder be given of operation of the present embodiment as arranged above. When the occupant is seated at the seat 56 and closes the door, the motor 54 rotates the sprocket, whereby the tape 42 is moved in the longitudinal direction, so that the truck 22 can move the anchor plate 20 from a position indicated by two-dot chain lines in FIG. 1 to a position indicated by solid lines, i.e., from the forward end portion 32A to the rear end portion 32B of the guide rail 30.

Figure 4A:
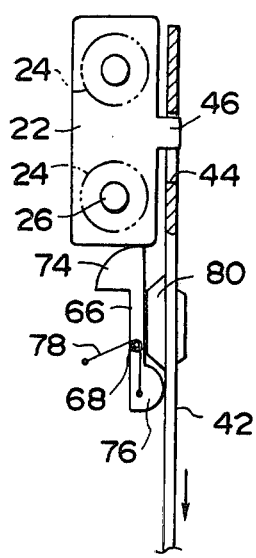
FIGS. 4A to 4C and 5A to 5C are sectional side views in explanation of the operating conditions.
Figure 4B:
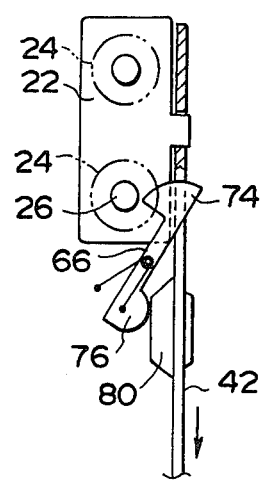
Figure 4C:
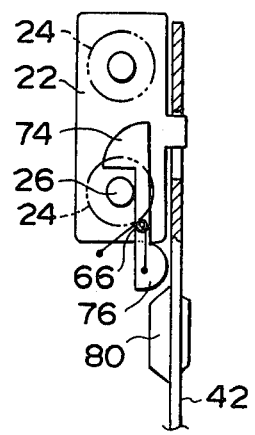
Figure 5A:
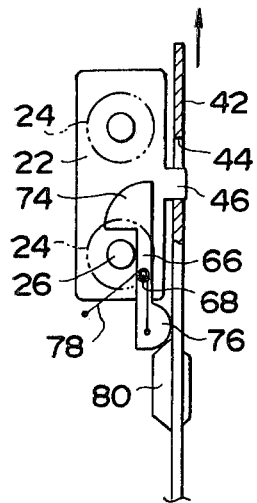

Description will hereunder be given of the process in which the truck 22 moves to the rear end portion 32B of the guide rail 30 with reference to FIGS. 4A through 4C. As shown in FIG. 4A, the truck 22 descends in the rear end portion 32B along with the movement of the tape 42. During this descent, the release block 80 of the tape 42 rotates the force receiving projection 76 of the locking lever 66 against the biasing force of the torsional coil spring 78 secured to the locking lever as shown in FIG. 4B. When the release block 80 further descends to be separated from the force receiving projection 76, the locking lever 66 is returned to the original position by the biasing force of the torsional coil spring 78. At this time of return, the lock pawl 74 locks the wheel shaft 26 of the truck 22 which has descended along with the tape, to thereby prevent the truck from being elevated as shown in FIG. 4C.

With the arrangement as described above, the webbing 10 can be automatically fastened to the occupant, and, during normal running condition of the vehicle, the webbing 10 can be wound off from the retractor 16, so that the driving posture can be changed.

Next, if the vehicle is involved in a collision, an inertia lock sensor of the retractor 16 suddenly interrupts the wind-off of the webbing 10, so that the occupant can be reliably restrained by the webbing 10. Namely, the anchor plate 20 is disposed in the rear end portion 32B constituting a vertical portion of the guide rail 30, whereby the anchor plate 20 does not move forwards in the vehicle, so that the outer end portion 18 of the webbing 10 can be reliably supported by the center pillar 36.

Furthermore, if the vehicle is overturned, the anchor plate 20 moves along the rear end portion 32B towards the roof side 28 to possibly make the occupant incompletely restrained. However, in the present embodiment, the lock pawl 74 of the locking lever 66 reliably engages the truck 22, whereby the anchor plate 20 does not move.

Figure 5B:
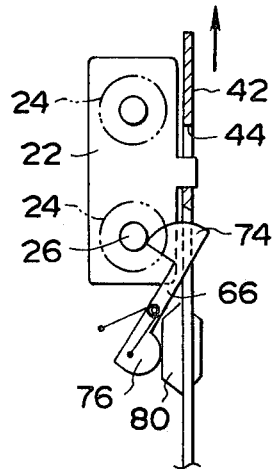
Figure 5C:
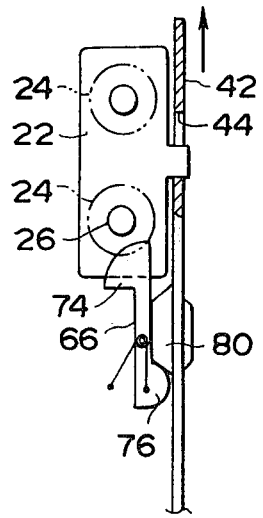

Description will hereunder be given of operation when the occupant leaves the vehicle. When the occupant opens the door, the motor 54 rotates in the reverse direction, whereby the tape 42 moves the truck 22 from the rear end portion 32B to the forward end portion 32A of the guide rail 30. In this case, as shown in FIG. 5A, the tape 42 abuts against the force receiving projection 76 of the locking lever 66 to rotate the locking lever 66 again as shown in FIG. 5B, whereby the lock pawl 74 can be disengaged from the wheel shaft 26 of the truck 22. Further, if the truck 22 is moved being driven by the tape 42, then the release block 80 is separated from the force receiving projection 76 of the locking lever 66, and the locking lever 66 is restored by the biasing force of the torsional coil spring 78. However, since the truck 22 has already moved along the guide rail, the lock pawl 74 does not engage the wheel shaft 24.

If the truck 22 moves the anchor plate 20 forward in the vehicle to a position indicated by the two-dot chain lines in FIG. 1, the webbing 10 is separated from the occupant's seat 66 to automatically unfasten the webbing, so that the occupant can easily leave the vehicle.

In addition, in the above-described embodiment, a webbing anchor lock mechanism has been described, wherein the lock pawl 74 of the locking lever 66 locks the truck 22. Needless to say, such lock pawl 74 is also applicable to a construction wherein the lock pawl 74 directly engages the anchor plate 20.

As has been described above, the webbing anchor lock mechanism according to the present invention includes a locking lever formed with a lock pawl for locking the anchor plate and a release block for rotating the locking lever, and hence, can offer such excellent advantages that the anchor plate can be reliably locked or unlocked with this simplified construction.

What is claimed is:

1. A webbing anchor lock mechanism used in an automatically fastening type seatbelt system for automatically fastening or unfastening a restraining webbing to an occupant of a vehicle, comprising:
(a) an anchor plate for engaging the end portion of said webbing;

(b) a driving member driven by a driving device for moving said anchor plate along a guide rail formed on the vehicle;

(c) a locking lever pivotally supported on said vehicle and provided at one end thereof with a locking pawl for locking said anchor plate to prevent the movement of said anchor plate;

(d) a reinforcing frame provided at the rear end portion of said guide rail, said reinforcing frame having a letter "U"-shaped receiving groove to receive a portion of said anchor plate when the webbing is automatically fastened to the occupant, said groove constituting a stopper for said anchor plate; and (e) a release block disengageably coupled to said driving member for movement with said driving member and to abut against said locking lever to rotate same for unlocking the locking pawl from the anchor plate; whereby, when said release block does not abut against the locking lever, said locking pawl reliably locks the anchor plate so that the tensile force of the webbing can be positively supported by the vehicle body in an emergency of the vehicle.

2. A webbing anchor lock mechanism as set forth in claim 1, wherein said driving member is formed into a tape-like form and penetratingly provided therein with a multiplicity of openings in the longitudinal direction thereof.

3. A webbing anchor lock mechanism as set forth in claim 1, wherein said anchor plate is secured to a truck guided by said guide rail.

4. A webbing anchor lock mechanism as set forth in claim 3, said truck has at least one wheel, said wheel turns along the guide rail, and said anchor plate is secured to a shaft of the wheel.

5. A webbing anchor lock mechanism as set forth in claim 4, wherein said locking lever locks said wheel shaft so as to lock said anchor plate.

6. A webbing anchor lock mechanism as set forth in claim 2, wherein said anchor plate is secured to a truck being guided by said guide rail, and a projection of said truck is inserted into one of said openings so as to be secured to said tape.

7. A webbing anchor lock mechanism as set forth in claim 1, wherein said locking lever is pivotally supported by a reinforcing frame secured to the vehicle.

8. A webbing anchor lock mechanism as set forth in claim 1, wherein said locking lever is provided at one end thereof with a locking pawl for locking the anchor plate and at the other end thereof with a force receiving projection for abutting against said release block.

9. A webbing anchor lock mechanism as set forth in claim 8, wherein said locking lever is biased in a direction in which said force receiving projection abuts against said release block.

10. A webbing anchor lock mechanism for supporting an anchor plate of a webbing for restraining an occupant to the vehicle body, comprising:

(a) an anchor plate for anchoring an end portion of said webbing;

(b) a guide rail provided on the vehicle body;

(c) a driving member being movable in said guide rail, said driving member comprising a tape having elongated slots provided therein;

(d) a truck having a projection smaller than said slots and inserted into one of said slots and is driven by said driving member to move along the rail, said truck supporting said anchor plate;

(e) a locking plate pivotally supported by the vehicle body, provided at one end portion thereof with a lock pawl for locking said truck to support a tensile force of the webbing in an emergency of the vehicle and biased to run in one direction;

(f) a reinforcing frame secured to said vehicle body for reinforcing said guide rail and for stopping the movement of said truck at a position wherein said webbing is fastened; and (g) a release block disengageably coupled to said driving member for abutting against an other portion of said locking plate; whereby said release block, when said driving member moves in a direction of automatically fastening said webbing to the occupant, rotates said locking plate, and thereafter, make the lock pawl lock the truck by said biasing force, and, when, said driving member moves in a direction of automatically unfastening said webbing from the occupant, rotates said locking plate and makes the truck movable with the driving member.

11. A webbing anchor lock mechanism according to claim 1, wherein said reinforcing frame surrounds said guide rail.

12. A webbing anchor lock mechanism according to claim 1, wherein said locking lever is supported on said reinforcing frame.

13. A webbing anchor lock mechanism according to claim 1, wherein said reinforcing frame is secured to a center pillar of the vehicle.

* * * * *